(12) United States Patent
Gilbert et al.

(10) Patent No.: US 7,885,253 B2
(45) Date of Patent: Feb. 8, 2011

(54) SYNCHRONIZATION OF SESSION-INITIATION-PROTOCOL PROXY DATABASES

(75) Inventors: Ezra Raphael Gilbert, Highland Park, NJ (US); Venkat R Gilakattula, Matawan, NJ (US)

(73) Assignee: Avaya Inc., Basking Ridge, NJ (US)

( * ) Notice: Subject to any disclaimer, the term of this patent is extended or adjusted under 35 U.S.C. 154(b) by 163 days.

(21) Appl. No.: 12/241,971

(22) Filed: Sep. 30, 2008

(65) Prior Publication Data

US 2010/0080130 A1    Apr. 1, 2010

(51) Int. Cl.
H04L 12/66 (2006.01)
(52) U.S. Cl. ........................................ 370/352
(58) Field of Classification Search .............. 370/216, 370/217, 218, 241, 242, 351, 389, 400, 410, 370/352; 709/227, 228, 229, 238, 242
See application file for complete search history.

(56) References Cited

U.S. PATENT DOCUMENTS

| | | | | |
|---|---|---|---|---|
| 2002/0136206 A1* | 9/2002 | Gallant et al. | ............... | 370/352 |
| 2006/0036747 A1* | 2/2006 | Galvin et al. | ............... | 709/228 |
| 2007/0276907 A1 | 11/2007 | Maes | | |
| 2008/0091831 A1 | 4/2008 | Rosenberg | | |
| 2009/0161666 A1* | 6/2009 | Ku | ............... | 370/356 |
| 2010/0008363 A1* | 1/2010 | Ee et al. | ............... | 370/392 |

FOREIGN PATENT DOCUMENTS

| | | |
|---|---|---|
| EP | 2 009 870 A1 | 12/2008 |
| WO | 2006092368 A1 | 9/2006 |
| WO | 2008031927 A1 | 3/2008 |

OTHER PUBLICATIONS

Euros Morris, "GB Application No. 0822856.1 Search Report", Mar. 9, 2009, Publisher: IPO UK, Published in: GB.

* cited by examiner

Primary Examiner—Kwang B Yao
Assistant Examiner—Obaidul Huq
(74) Attorney, Agent, or Firm—DeMont & Breyer, LLC

(57) ABSTRACT

An improvement in the design and operation of telecommunications networks is described in which when a caller's telecommunication terminal does not know the address of the called party's telecommunications terminal, the caller's telecommunication terminal contacts one Session Initiation Protocol Proxy server after another until the address of the called party's telecommunications terminal is found. Thereafter, one or more of the Session Initiation Protocol Proxy servers that did not have the address of the called party's telecommunications terminal are populated with that information for future use.

2 Claims, 4 Drawing Sheets

SYNCHRONIZATION OF SESSION-INITIATION-PROTOCOL PROXY DATABASES

FIELD OF THE INVENTION

The present invention relates to telecommunications in general, and, more particularly, to Voice-over-Internet-Protocol ("VoIP") networks.

BACKGROUND OF THE INVENTION

In a conventional telephone network, a caller must know the telephone number of the telephone associated with the called party. When the caller does not know the telephone number, the caller can contact directory assistance to get the number.

In a new Voice-over-Internet-Protocol ("VoIP") telephone network, a caller's telecommunications terminal must know the Internet address of the telecommunications terminal associated with the called party. When the caller's telecommunications terminal does not know the address of the called party's telecommunications terminal, the caller's telecommunications terminal can contact a Session Initiation Protocol Proxy server to get the address based on the called party's name. Some Session Initiation Proxy servers will comprise the mapping of the called party's name to the address of the called party's telecommunications terminal, and some will not, which can frustrate or hinder the ability of the caller to communicate with the called party. For this reason, the need exists for an improvement in how Voice-over-Internet-Protocol telephone networks operate.

SUMMARY OF THE INVENTION

The present invention provides an improvement in the design and operation of telecommunications networks without some of the costs and disadvantages associated with telecommunications networks in the prior art. In accordance with the illustrative embodiment, when a caller's telecommunication terminal does not know the address of the called party's telecommunications terminal, the caller's telecommunication terminal contacts one Session Initiation Protocol Proxy server after another until the address of the called party's telecommunications terminal is found. Thereafter, one or more of the Session Initiation Protocol Proxy servers that did not have the address of the called party's telecommunications terminal are populated with that information for future use.

In accordance with the illustrative embodiment, the caller's telecommunications terminal populates the Session Initiation Protocol Proxy servers with that information, but in accordance with some alternative embodiments of the present invention, the called party's telecommunications terminal populates the Session Initiation Protocol Proxy servers with that information. In accordance with yet other some other alternative embodiments, the Session Initiation Protocol Proxy server that comprised the information populates the Session Initiation Protocol Proxy servers that did not have the information. In any case, the present invention provides an improvement in the design and operation of telecommunications networks.

The illustrative embodiment comprises: transmitting from a first telecommunications terminal a first request to a first database for an address of a first party in a telecommunications network; receiving at the first telecommunications terminal a first notification that the first database fails to comprise a mapping of an indicium of the first party to an address of the first party in the telecommunications network; transmitting from the first telecommunications terminal a second request to a second database for the address of the first party in the telecommunications network; receiving at the first telecommunications terminal a second notification that the second database does comprise a mapping of an indicium of the first party to an address of the first party in the telecommunications network; and populating the first database with a mapping of an indicium of the first party to the address of the first party in the telecommunications network.

DETAILED DESCRIPTION

Figure 1:
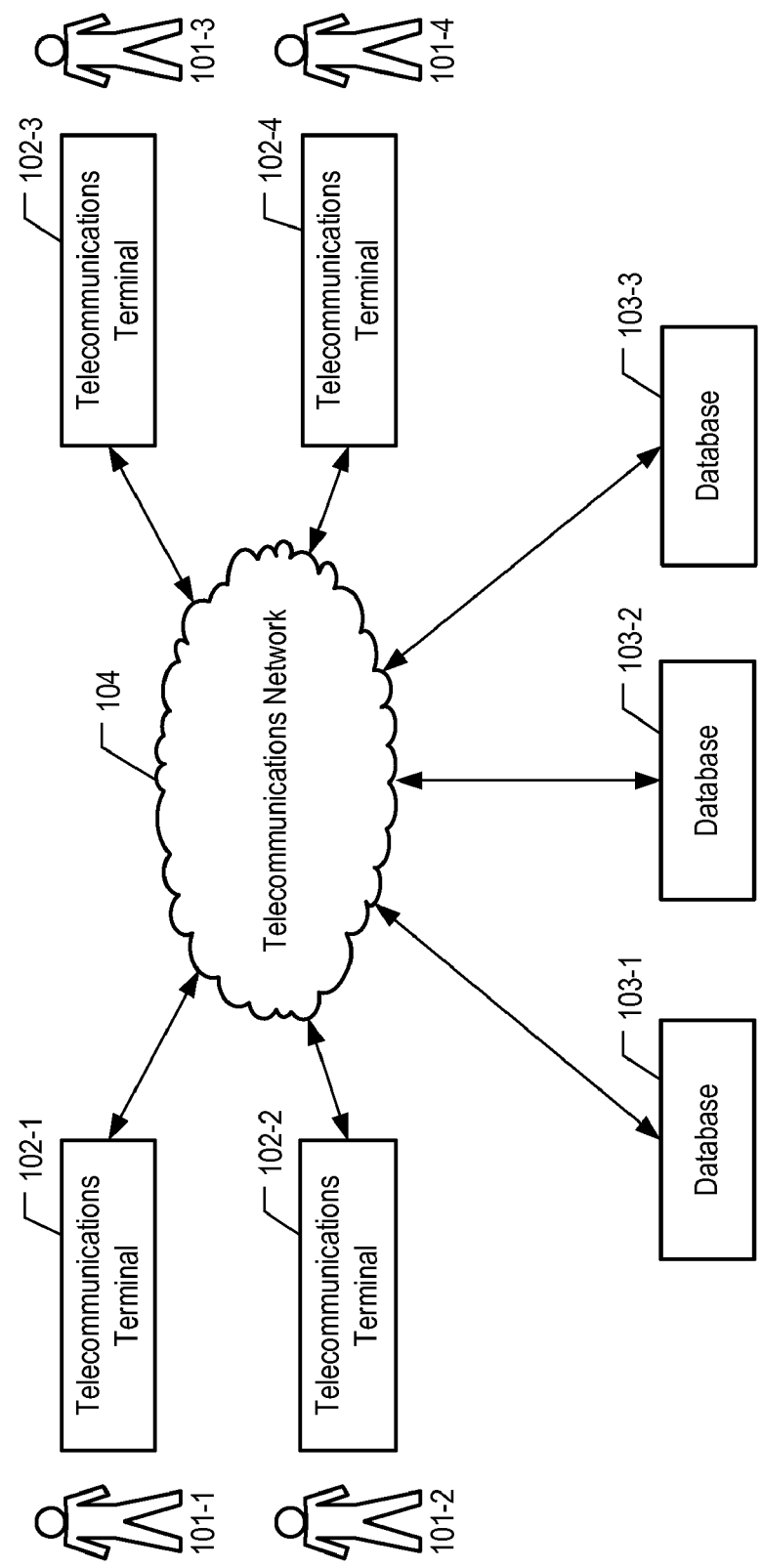
FIG. 1 depicts a schematic diagram of a portion of telecommunications system 100 in accordance with the illustrative embodiment of the present invention.

FIG. 1 depicts a schematic diagram of a portion of telecommunications system 100 in accordance with the illustrative embodiment of the present invention. Telecommunications system 100 comprises: people 101-1 through 101-4, telecommunications terminals 102-1 through 102-4, databases 103-1 through 103-3, and telecommunications network 104, interconnected as shown. Although telecommunications system 100 comprises four people, four telecommunications terminals, and three databases, it will be clear to those skilled in the art, after reading this disclosure, how to make and use alternative embodiments of the present invention which comprise any number of people, any number of telecommunications terminals, and any number of databases.

Telecommunications terminal 102-$x$ is hardware and software for enabling person 101-$x$ to communicate with person 101-$y$ who is using telecommunications terminal 102-$y$, wherein $x$ & $y \in \{1, 2, 3, 4\}$ and $x \neq y$. In accordance with the illustrative embodiment, telecommunications terminal 102-$x$ is a Voice-over-Internet-Protocol ("VoIP") device that uses the Session Initiation Protocol, but it will be clear to those skilled in the art, after reading this disclosure, how to make and use alternative embodiments of the present invention in which one or more of the telecommunications terminals use another technology and another protocol.

Database 103-$a$ is hardware and software for enabling telecommunications terminal 102-$x$ to initiate communication with telecommunications terminal 102-$y$, wherein $a \in \{1, 2, 3\}$. In particular, database 103-$a$ is a Session Initiation Protocol Proxy server, which comprises a table that lists a mapping of an indicium of a person to an address of a telecommunications terminal in telecommunications network 104. An example of such a list is depicted in Table 1.

TABLE 1

Mapping of People to Addresses in
Telecommunications Network 104

| Person | Address |
|---|---|
| John Lennon | 192.245.2.1 |
| George Harrison | 128.33.22.1 |
| Ringo Starr | 42.222.43.1 |

Although database 103-a is a Session Initiation Protocol server, it will be clear to those skilled in the art, after reading this disclosure, how to make and use alternative embodiments of the present invention in which database 103-a conforms to a different protocol.

Telecommunications network 104 is the Internet, but it will be clear to those skilled in the art, after reading this disclosure, how to make and use alternative embodiments of the present invention in which telecommunications network 104 is another network, such as for example and without limitation, the Public Switched Telephone Network, etc.

Figure 2:
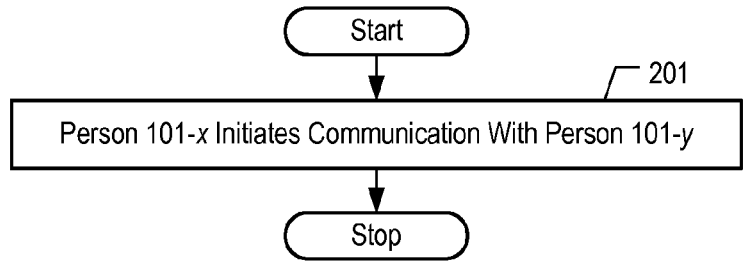
FIG. 2 depicts a flowchart of the salient macro-task performed by the illustrative embodiment of the present invention.

FIG. 2 depicts a flowchart of the salient macro-task performed by the illustrative embodiment of the present invention. At task 201, person 101-x initiates communication with person 101-y through telecommunications network 104. In accordance with the illustrative embodiment, task 201 is performed from each person 101-x to each person 101-y. The details of task 201 are described in detail below.

Figure 3:
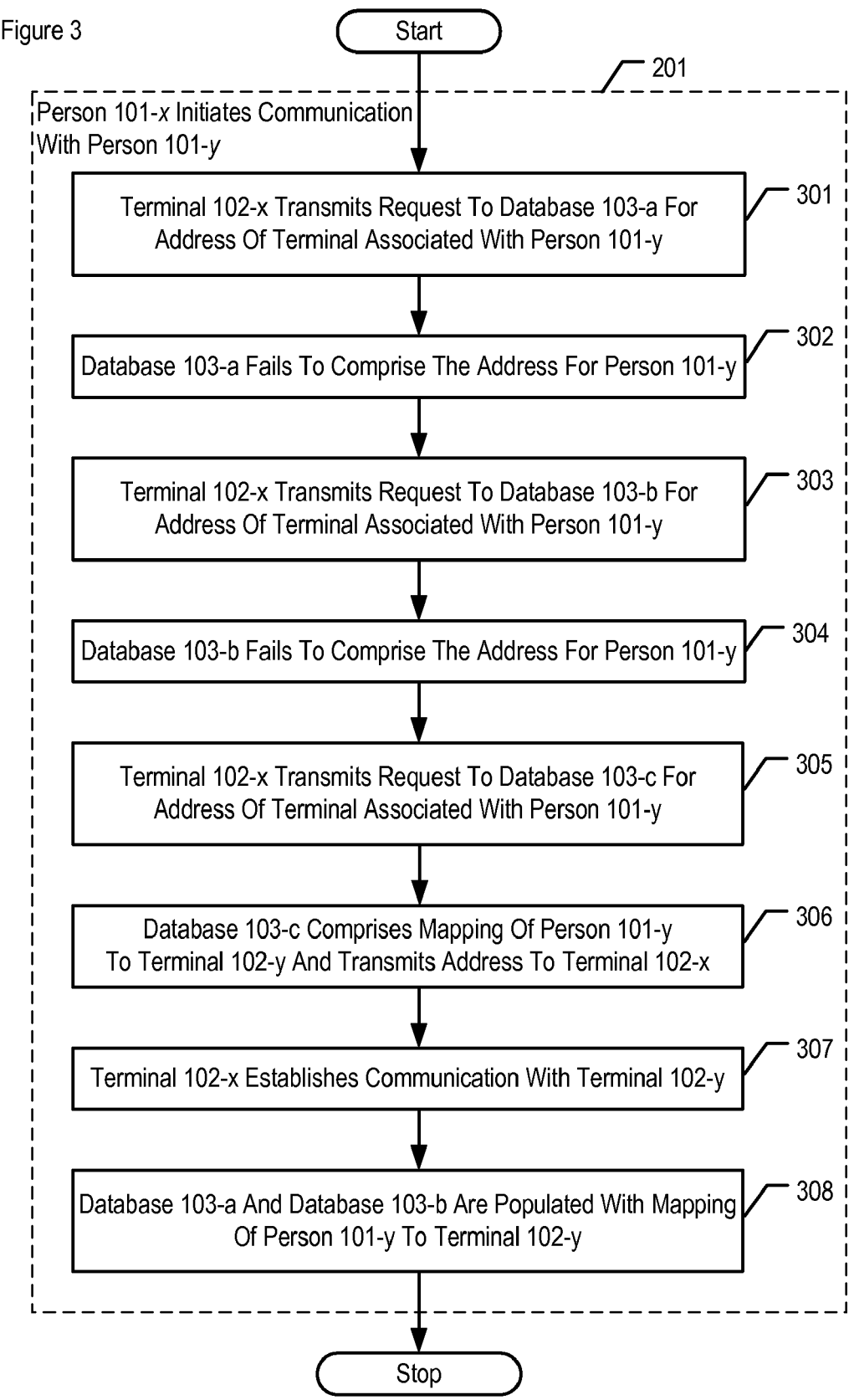
FIG. 3 depicts a flowchart of the salient tasks associated with task 201, as depicted in FIG. 2.

FIG. 3 depicts a flowchart of the salient tasks associated with task 201, as depicted in FIG. 2.

At task 301, person 101-x uses telecommunications terminal 102-x to call person 101-y. As part of task 301, telecommunications terminal 102-x transmits a request to database 103-a for the address of the telecommunications terminal associated with person 101-y.

At task 302, database 103-a transmits—and telecommunications terminal 102-x receives—notification that database fails to comprise an address in telecommunications network 104 for person 101-y.

Because the request to database 103-a in task 301 failed, at task 303, telecommunications terminal 102-x transmits a request to database 103-b for the address of the telecommunications terminal associated with person 101-y.

At task 304, database 103-b transmits—and telecommunications terminal 102-x receives—notification that database fails to comprise an address in telecommunications network 104 for person 101-y.

Because the request to database 103-a in task 303 failed, at task 305, telecommunications terminal 102-x transmits a request to database 103-c for the address of the telecommunications terminal associated with person 101-y.

At task 306, database 103-c transmits—and telecommunications terminal 102-x receives—the address of the telecommunications terminal associated with person 101-y.

At task 307, telecommunications terminal 102-x establishes communication with telecommunications terminal 102-y, which enables person 101-x to talk with person 101-y.

At task 307, database 103-a and database 103-b are populated with a mapping of an indicium of person 101-y to the address of telecommunications terminal 102-y in telecommunications network 104 so that the next time those databases have that information. The details of task 307 are described below.

Figure 4:
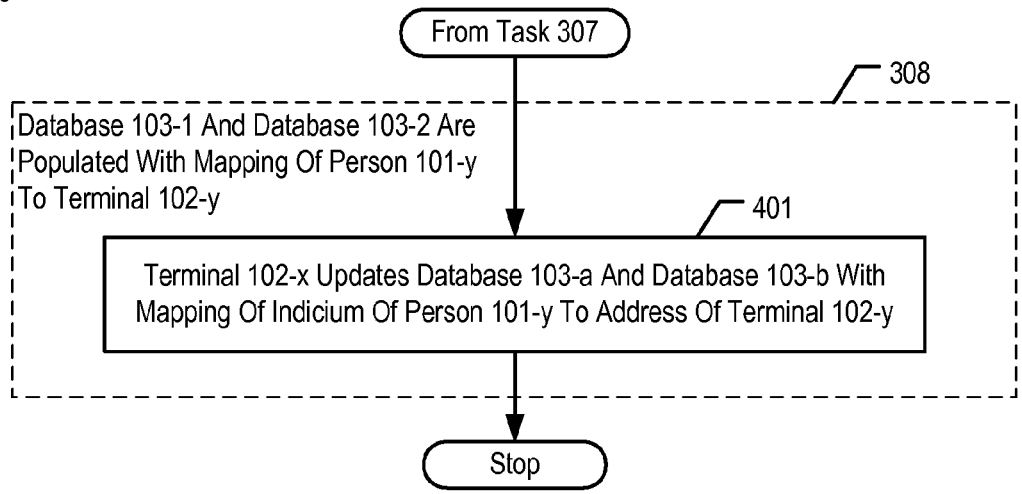
FIG. 4 depicts a flowchart the salient task associated with the performance of task 307.

FIG. 4 depicts a flowchart the salient task associated with the performance of task 307. At task 401, terminal 102-x updates database 103-a and database 103-b with the mapping of an indicium of person 101-y to the address of telecommunications terminal 102-y in telecommunications network 104.

Figure 5:
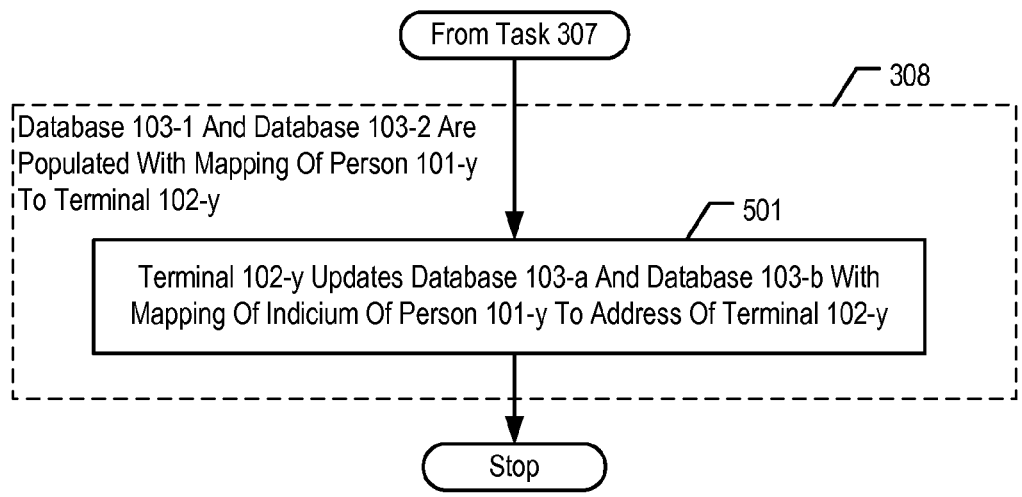
FIG. 5 depicts a flowchart an alternative method for performing task 307.

FIG. 5 depicts a flowchart an alternative method for performing task 307. At task 501, terminal 102-y updates database 103-a and database 103-b with the mapping of an indicium of person 101-y to the address of telecommunications terminal 102-y in telecommunications network 104.

Figure 6:
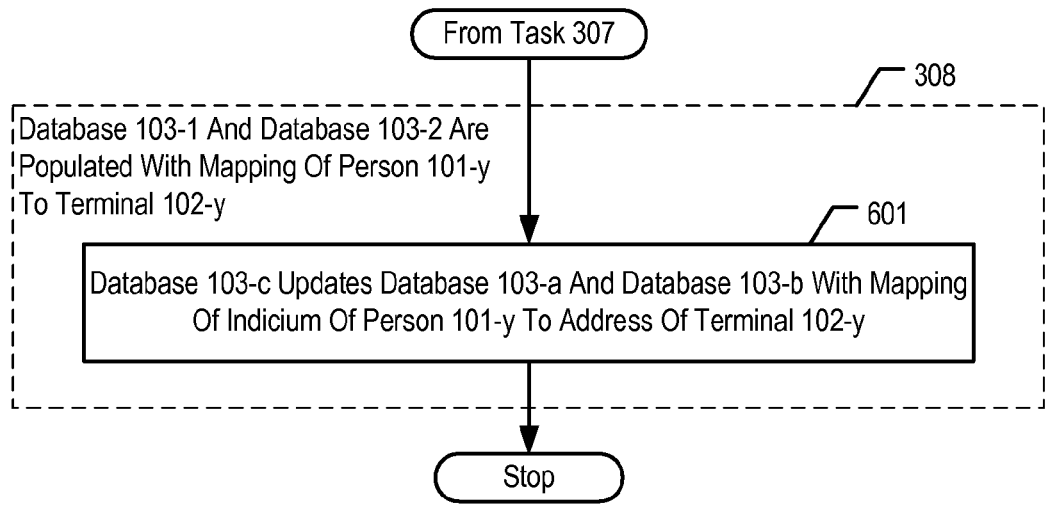
FIG. 6 depicts a flowchart an alternative method for performing task 307.

FIG. 6 depicts a flowchart an alternative method for performing task 307. At task 601, database 103-c updates database 103-a and database 103-b with the mapping of an indicium of person 101-y to the address of telecommunications terminal 102-y in telecommunications network 104.

Figure 7:
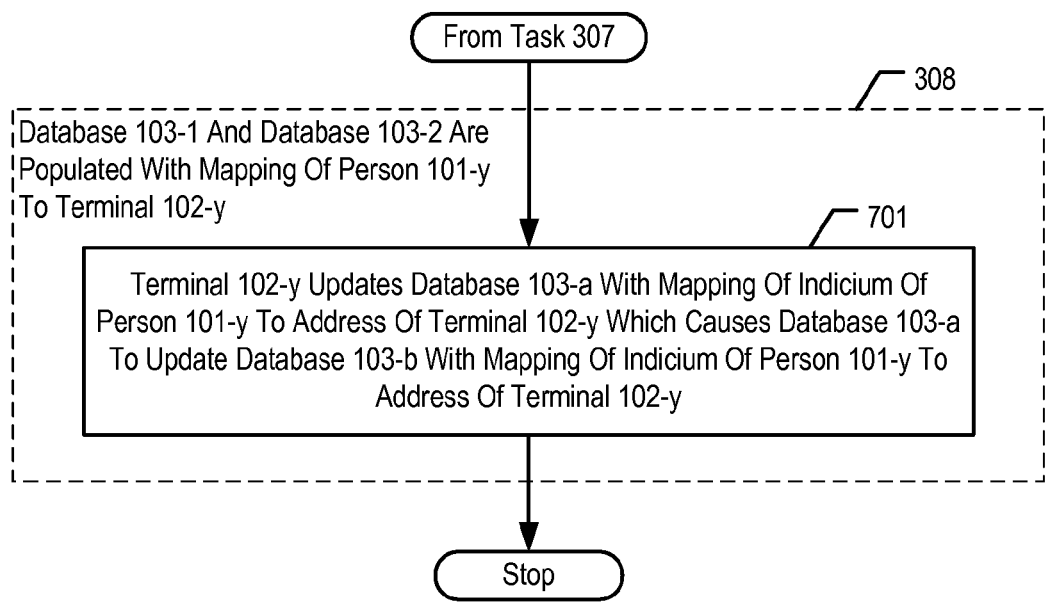
FIG. 7 depicts a flowchart an alternative method for performing task 307.

FIG. 7 depicts a flowchart an alternative method for performing task 307. At task 701, database 103-c updates database 103-a with the mapping of an indicium of person 101-y to the address of telecommunications terminal 102-y in telecommunications network 104, which causes database 103-b to update database 103-a with the mapping of an indicium of person 101-y to the address of telecommunications terminal 102-y in telecommunications network 104.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
transmitting from a first telecommunications terminal a first request to a first database for an address of a first party in a telecommunications network;
receiving at the first telecommunications terminal a first notification that the first database fails to comprise a mapping of an indicium of the first party to an address of the first party in the telecommunications network;
transmitting from the first telecommunications terminal a second request to a second database for the address of the first party in the telecommunications network;
receiving at the first telecommunications terminal a second notification that the second database does comprise a mapping of an indicium of the first party to an address of the first party in the telecommunications network;
populating the first database with a mapping of an indicium of the first party to the address of the first party in the telecommunications network;
transmitting from a second telecommunications terminal a third request to the second database for an address of a second party in the telecommunications network;
receiving at the second telecommunications terminal a third notification that the second database fails to comprise a mapping of an indicium of the second party to an address of the second party in the telecommunications network;
transmitting from the second telecommunications terminal a fourth request to a third database for the address of the second party in the telecommunications network;
receiving at the second telecommunications terminal a fourth notification that the third database does comprise a mapping of an indicium of the second party to an address of the second party in the telecommunications network; and
populating the second database with a mapping of an indicium of the second party to the address of the second party in the telecommunications network.

2. The method of claim 1 further comprising:
receiving a fifth notification that the first database fails to comprise a mapping of the indicium of the second party to an address of the second party; and
populating the first database with a mapping of an indicium of the second party to the address of the second party in the telecommunications network.

* * * * *